United States Patent
Zhou (10) Patent No.: US 9,143,404 B2
(45) Date of Patent: Sep. 22, 2015

(54) NETWORK DATA CONFIGURATION METHOD AND NETWORK DATA CONFIGURATION SYSTEM

(75) Inventor: Kun Zhou, Shenzhen (CN)

(73) Assignee: ZTE Corporation, Shenzhen (CN)

(*) Notice: Subject to any disclaimer, the term of this patent is extended or adjusted under 35 U.S.C. 154(b) by 384 days.

(21) Appl. No.: 13/811,387

(22) PCT Filed: May 24, 2011

(86) PCT No.: PCT/CN2011/074596
§ 371 (c)(1), (2), (4) Date: Jan. 22, 2013

(87) PCT Pub. No.: WO2012/010011
PCT Pub. Date: Jan. 26, 2012

(65) Prior Publication Data
US 2013/0144993 A1    Jun. 6, 2013

(30) Foreign Application Priority Data
Jul. 23, 2010   (CN) .......................... 2010 1 0238354

(51) Int. Cl.
*G06F 15/177*  (2006.01)
*H04L 12/24*   (2006.01)
*H04L 12/46*   (2006.01)

(52) U.S. Cl.
CPC ........ *H04L 41/0889* (2013.01); *H04L 41/0806* (2013.01); *H04L 41/0823* (2013.01); *H04L 41/0879* (2013.01); *H04L 12/4641* (2013.01); *H04L 41/0213* (2013.01)

(58) Field of Classification Search
CPC ............ H04L 41/0803; H04L 41/0806; H04L 41/0813; H04L 41/0866; H04L 41/0889
USPC ................................................. 709/220, 203
See application file for complete search history.

(56) References Cited

U.S. PATENT DOCUMENTS 5,557,748 A   9/1996  Norris
6,112,085 A   8/2000  Garner
(Continued)

FOREIGN PATENT DOCUMENTS

CN    1866848 A    11/2006
CN   101005399 A    7/2007
CN   101908975 A   12/2010

OTHER PUBLICATIONS

Distributed Permissions Management of Switches, Oct. 31, 2007 (7 pages total, see English summary).
(Continued)

*Primary Examiner* — Duyen Doan
(74) *Attorney, Agent, or Firm* — Oppedahl Patent Law Firm LLC (57) ABSTRACT

The disclosure provides a network data configuration method and a network data configuration system. The network data configuration method includes the following steps: when receiving a configuration command that instructs configuring data for a network device, the network data configuration system enters a global configuration mode; when receiving in the global configuration mode a mode switch command that instructs switching to a first configuration mode, the network data configuration system switches directly from the global configuration mode to the first configuration mode, wherein the first configuration mode is any configuration mode under the global configuration mode; when receiving in the first configuration mode a mode switch command that instructs switching to a second configuration mode, the network data configuration system exits from the first configuration mode and switching directly to the second configuration mode, wherein the second configuration mode is the global configuration mode or any configuration mode under the global configuration mode. The application of the disclosure can effectively reduce mode switch operations in the process of network data configuration and improve the configuration efficiency of network data.

5 Claims, 4 Drawing Sheets

(56) References Cited

U.S. PATENT DOCUMENTS

| | | | |
|---|---|---|---|
| 7,171,462 B1 * | 1/2007 | Kavasseri et al. | 709/223 |
| 7,626,944 B1 | 12/2009 | Riddle | |
| 2002/0010865 A1 * | 1/2002 | Fulton et al. | 713/201 |
| 2005/0132042 A1 | 6/2005 | Cryer | |
| 2005/0132043 A1 | 6/2005 | Wang et al. | |
| 2006/0092134 A1 * | 5/2006 | Ohara | 345/161 |
| 2007/0082699 A1 * | 4/2007 | Karaoguz et al. | 455/553.1 |
| 2007/0274285 A1 * | 11/2007 | Werber et al. | 370/351 |
| 2010/0115490 A1 * | 5/2010 | Wilcock et al. | 717/104 |
| 2010/0204970 A1 * | 8/2010 | Loomans et al. | 703/6 |
| 2011/0078434 A1 * | 3/2011 | Chu et al. | 713/100 |
| 2011/0209203 A1 * | 8/2011 | Shafer | 726/4 |
| 2011/0231543 A1 * | 9/2011 | Akazawa et al. | 709/224 |

OTHER PUBLICATIONS

Webmaster Tutorials, Apr. 2010 (8 pages total, see English summary).

International Search Report in international application No. PCT/CN2011/074596, mailed on Sep. 8, 2011.

English Translation of the Written Opinion of the International Search Authority in international application No. PCT/CN2011/074596, mailed on Sep. 8, 2011.

\* cited by examiner

NETWORK DATA CONFIGURATION METHOD AND NETWORK DATA CONFIGURATION SYSTEM

TECHNICAL FIELD

The disclosure relates to the technology field of network communications, and in particular to a network data configuration method and a network data configuration system.

BACKGROUND

Figure 1:
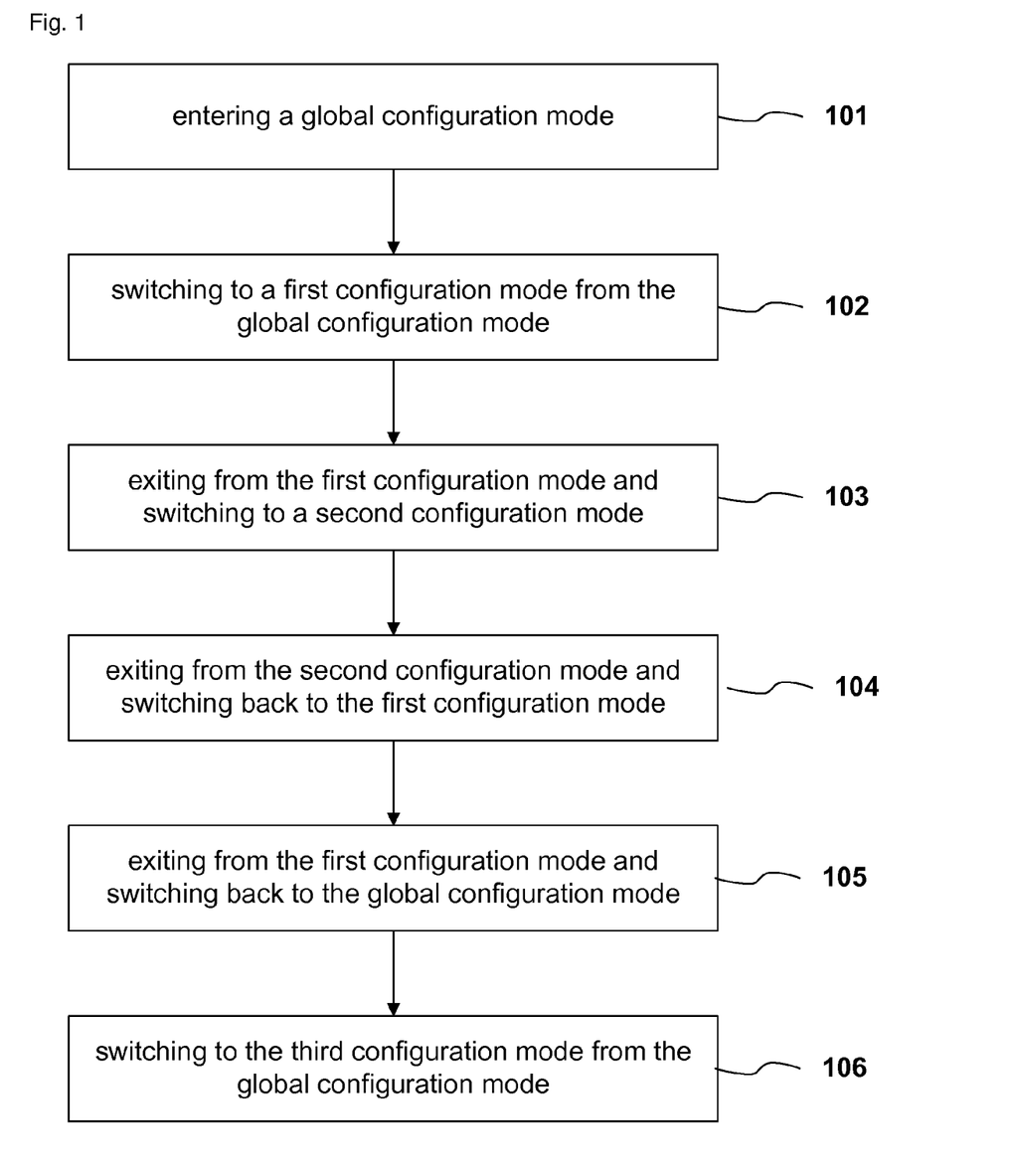
FIG. 1 shows a flowchart of a network data configuration method in a related art.

At present, network administrator generally configures data for a network device using a Command Line Interface (CLI) provided on the network device; the specific configuration method, as shown in FIG. 1, mainly includes the following steps:

Step 101: first entering a global configuration mode according to an input configuration command, wherein the global configuration mode can contain a plurality of configuration modes and each configuration mode further can contain a plurality of configuration modes, like a tree structure; the global configuration mode contains a plurality of subnodes and each subnode also can contain a plurality of subnodes, and so on. Each configuration mode corresponds to a specific module on the network device;

Step 102: if it is needed to configure data in a first configuration mode (a subnode of the global configuration mode), inputting a mode switch command in the global configuration mode, switching from the global configuration mode to the first configuration mode and configuring data in the first configuration mode;

Step 103: if it is further needed to configure data in a second configuration mode (a subnode of the first configuration mode), then inputting a mode switch command in the first configuration mode, exiting from the first configuration mode, switching to the second configuration mode and configuring data in the second configuration mode;

Step 104: if it is further needed to configure data in a third configuration mode (a subnode of the global configuration mode), then inputting an exit command in the second configuration mode, exiting from the second configuration mode and switching back to the first configuration mode;

Step 105: inputting an exit command in the first configuration mode, exiting from the first configuration mode and switching back to the global configuration mode;

Step 106: inputting a mode switch command in the global configuration mode, switching to the third configuration mode from the global configuration mode, and configuring data in the third configuration mode.

Figure 2:
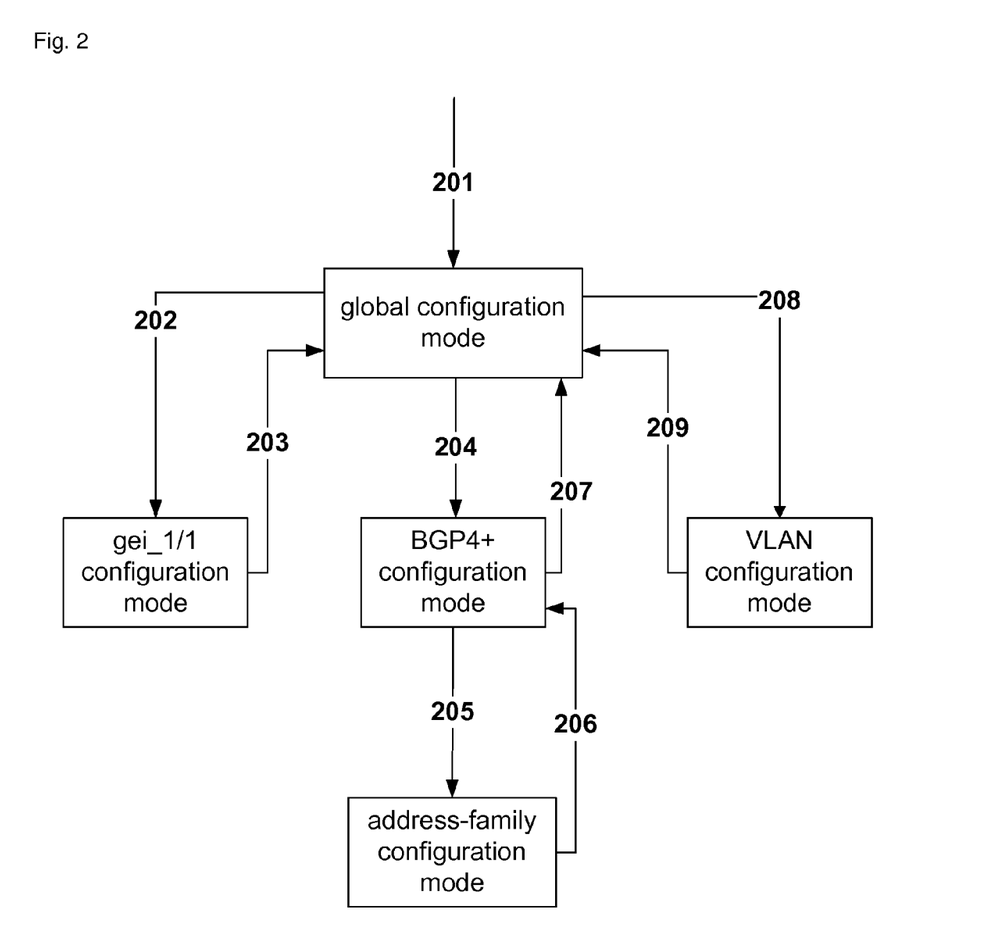
FIG. 2 shows a diagram of a specific embodiment of the network data configuration method in the related art.

As shown in FIG. 2, a specific embodiment of the above network data configuration method is provided; supposing the content of data configuration needed to be completed is as follows: data configuration of a gei_1/1 (Gigabit Ethernet Interface) module, data configuration of a BGP4+ (Border Gateway Protocol) module, data configuration of an address-family module and data configuration of a Virtual Local Area Network (VLAN) module.

From Step 201 to Step 209, it can be seen that, after configuring data of one module, if it is expected to configure data of another module, it is needed to return to the global configuration mode from the configuration mode corresponding to the current module level by level and then to switch to the configuration mode corresponding to a next module from the global configuration mode level by level; for example, when it is needed to switch to the VLAN configuration mode from the address-family configuration mode of a subnode of the BGP4+ configuration mode as shown in FIG. 2, it is needed to switch first to the BGP4+ configuration mode from the address-family configuration mode, and then to the global configuration mode from the BGP4+ configuration mode, and finally to the VLAN configuration mode from the global configuration mode; during this process, multiple mode switch operations are executed, thus, the configuration efficiency of network data would be impacted inevitably.

SUMMARY

In view of the above, the disclosure provides a network data configuration method and a network data configuration system, which can effectively reduce mode switch operations in the process of network data configuration and improve the configuration efficiency of network data.

In order to solve the problem above, the disclosure provides a network data configuration method, which includes the following steps:

when receiving a configuration command that instructs configuring data for a network device, a network data configuration system enters a global configuration mode;

when receiving in the global configuration mode a mode switch command that instructs switching to a first configuration mode, the network data configuration system switches directly from the global configuration mode to the first configuration mode, wherein the first configuration mode is any configuration mode under the global configuration mode; and when receiving in the first configuration mode a mode switch command that instructs switching to a second configuration mode, the network data configuration system exits from the first configuration mode and switching directly to the second configuration mode, wherein the second configuration mode is the global configuration mode or any configuration mode under the global configuration mode.

Before the network data configuration system switches directly from the global configuration mode to the first configuration mode, the method may further include:

the network data configuration system configures a logic channel used for switching to the first configuration mode for the global configuration mode;

the process that the network data configuration system switches directly from the global configuration mode to the first configuration mode may include:

the network data configuration system judges whether a user who performs data configuration currently has permission to operate in the first configuration mode; and     when the user who performs data configuration currently has permission to operate in the first configuration mode, the network data configuration system switches directly to the first configuration mode.

Before the network data configuration system switches directly to the second configuration mode, the method may further include:

the network data configuration system configures a logic channel used for switching to the second configuration mode for the first configuration mode;

the process that the network data configuration system exits from the first configuration mode and switches directly to the second configuration mode may include:

the network data configuration system acquires the logic channel configured for the first configuration mode and used for switching to the second configuration mode; and     the network data configuration system exits from the first configuration mode and switches directly to the second configuration mode according to the logic channel used for switching to the second configuration mode.

Before the network data configuration system switches directly from the global configuration mode to the first configuration mode by the network data configuration system, the method may further include:

the network data configuration system configures permission for a user who performs data configuration, wherein each user has permission to operate in one or more configuration modes;

the process that the network data configuration system switches directly from the global configuration mode to the first configuration mode may include:

the network data configuration system judges whether a user who performs data configuration currently has permission to operate in the first configuration mode; and when the user who performs data configuration currently has permission to operate in the first configuration mode, the network data configuration system switches directly to the first configuration mode.

Before the network data configuration system switches directly to the second configuration mode by the network data configuration system, the method may further include:

the network data configuration system configures permission for the user who performs data configuration by, wherein each user has permission to operate in one or more configuration modes;

the process that the network data configuration system exits from the first configuration mode and switches directly to the second configuration mode may include:

the network data configuration system judges whether a user who performs data configuration currently has permission to operate in the second configuration mode; and when the user who performs data configuration currently has permission to operate in the second configuration mode, the network data configuration system exits from the first configuration mode and switches directly to the second configuration mode.

The disclosure also provides a network data configuration system, which includes:

an execution module, which is configured to enter a global configuration mode when receiving a configuration command that instructs configuring data for a network device;

a first switch module, which is configured to switch directly from the global configuration mode to a first configuration mode when receiving in the global configuration mode a mode switch command that instructs switching to the first configuration mode, wherein the first configuration mode is any configuration mode under the global configuration mode; and a second switch module, which is configured to exit from the first configuration mode and to switch directly to a second configuration mode when receiving in the first configuration mode a mode switch command that instructs switching to the second configuration mode, wherein the second configuration mode is the global configuration mode or any configuration mode under the global configuration mode.

The network data configuration system may further include:

a first configuration module, which is configured to configure a logic channel used for switching to the first configuration mode for the global configuration mode;

the first switch module may include:

a first acquisition module, which is configured to acquire the logic channel configured for the global configuration mode and used for switching to the first configuration mode; and a first processing module, which is configured to switch directly to the first configuration mode according to the logic channel used for switching to the first configuration mode.

The network data configuration system may further include: a second configuration module, which is configured to configure a logic channel used for switching to the second configuration mode for the first configuration mode;

the second switch module may include:

a second acquisition module, which is configured to acquire the logic channel configured for the first configuration mode and used for switching to the second configuration mode; and a second processing module, which is configured to exit from the first configuration mode and to switch directly to the second configuration mode according to the logic channel used for switching to the second configuration mode.

The network data configuration system further may include:

a third configuration module, which is configured to configure permission for a user who performs data configuration, wherein each user has permission to operate in one or more configuration modes;

the first switch module may include:

a first judgment module, which is configured to judge whether a user who performs data configuration currently has permission to operate in the first configuration mode; and a third processing module, which is configured to switch directly to the first configuration mode when the user who performs data configuration currently has permission to operate in the first configuration mode.

The second switch module may include:

a second judgment module, which is configured to judge whether the user who performs data configuration currently has permission to operate in the second configuration mode; and a fourth processing module, which is configured to exit from the first configuration mode and to switch directly to the second configuration mode when the user who performs data configuration currently has permission to operate in the second configuration mode.

The disclosure has the advantages as follows:

it realizes switching directly from a global configuration mode to any configuration mode under the global configuration mode without entering modes level by level, switching directly from any configuration mode under the global configuration mode back to the global configuration mode without exiting from modes level by level, and switching directly from any configuration mode under the global configuration mode to any other configuration mode under the global configuration mode, thereby effectively reducing mode switch operations in the process of network data configuration and improving the configuration efficiency of network data.

DETAILED DESCRIPTION

The specific implementation of the disclosure is described below in further detail in conjunction with accompanying drawings and embodiments.

Figure 3:
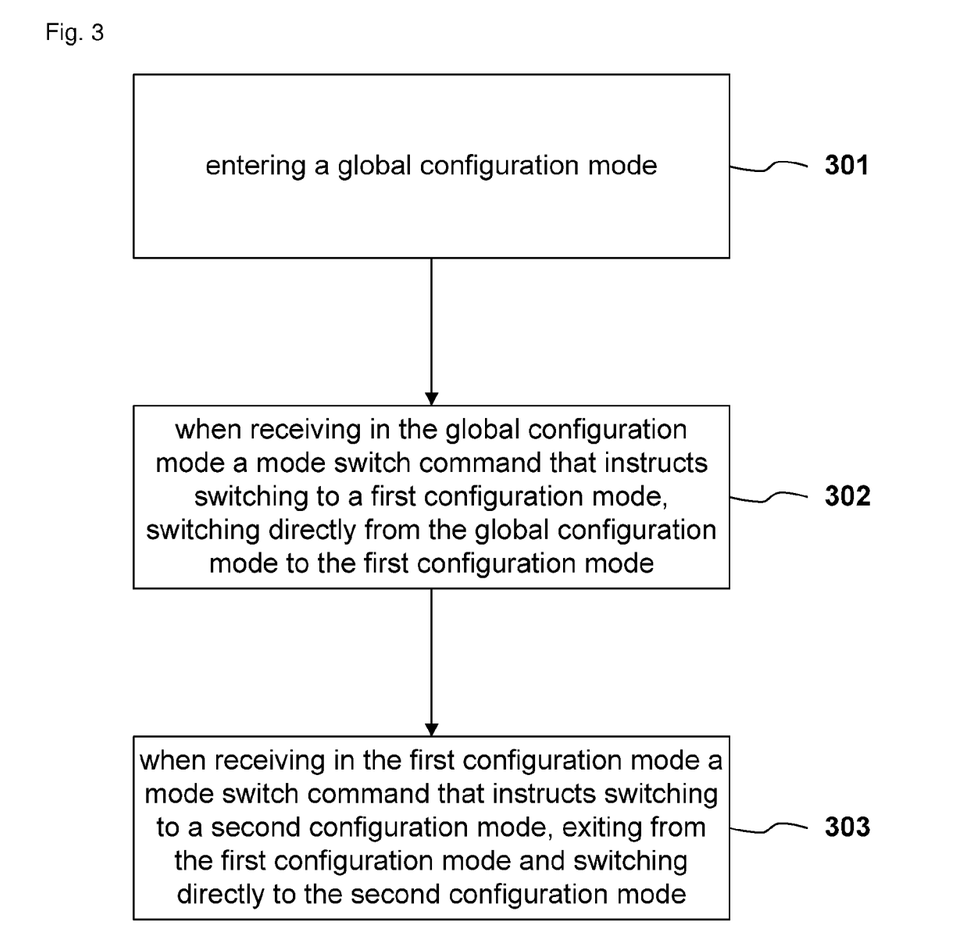
FIG. 3 shows a flowchart of a network data configuration method in an embodiment of the disclosure.

As shown in FIG. 3, a flowchart of a network data configuration method in an embodiment of the disclosure is provided, wherein the network data configuration method includes the following steps.

Step 301: when receiving a configuration command that instructs configuring data for a network device, a network data configuration system enters a global configuration mode.

The network devices involved in the embodiment of the disclosure can be a router, a switch and so on. The global configuration mode can contain a plurality of configuration submodes, and each configuration submode further can contain a plurality of configuration submodes, like a tree structure; the global configuration mode contains a plurality of subnodes (corresponding to the first-level configuration submode under the global configuration mode), and each subnode further can contain a plurality of subnodes (corresponding to the second-level configuration submode under the global configuration mode), and so on. Each configuration mode corresponds to a specific module on a network device, wherein the specific module can be a physical device, for example, a VLAN port of the network device, or can be a function module, for example, a BGP4+ protocol module of the network device; under the configuration mode corresponding to each module, a command that instructs performing data configuration on this module can be executed to configure the data of this module.

Step 302: when receiving in the global configuration mode a mode switch command that instructs switching to a first configuration mode, the network data configuration system switches directly from the global configuration mode to the first configuration mode, wherein the first configuration mode is any configuration mode under the global configuration mode, that is, the first configuration mode can be the first-level configuration submode (subnode) under the global configuration mode, the second-level configuration submode (grandchild node), or the Nth-level configuration submode.

Step 303: when receiving in the first configuration mode a mode switch command that instructs switching to a second configuration mode, the network data configuration system exits from the first configuration mode and switches directly to the second configuration mode, wherein the second configuration mode is the global configuration mode or any configuration mode under the global configuration mode.

With the method provided by the embodiment above, the system can switch directly from the global configuration mode to any configuration mode under the global configuration mode, for example, switch directly to a child node, a grandchild node or a great-grandchild node of the global configuration mode, without entering the modes level by level; moreover, the system also can switch directly from any configuration mode under the global configuration mode back to the global configuration mode, without exiting from the modes level by level; further, the system also can switch directly from any configuration mode under the global configuration mode to any other configuration mode under the global configuration mode; thus, mode switch operations in the process of network data configuration can be effectively reduced and the configuration efficiency of network data can be improved.

In the above embodiment, before switching directly from the global configuration mode to the first configuration mode, it is needed to configure a logic channel used for switching to the first configuration mode for the global configuration mode; similarly, before switching from the first configuration mode to the second configuration mode, it is needed to configure a logic channel used for switching to the second configuration mode for the first configuration mode.

To take configuring the logic channel used for switching from the first configuration mode to the second configuration mode for example, the process for configuring the logic channel can be as follows: first acquiring a jump interface of the second configuration mode and then saving the jump interface of the second configuration mode under the first configuration mode, thereby establishing a logic channel used for switching from the first configuration mode to the second configuration mode. When it is needed to switch from the first configuration mode to the second configuration mode, the second configuration mode can be directly switched to by inputting a special switch command and the jump interface of the second configuration mode in the first configuration mode.

In addition, the logic channel also can be configured by other ways, for example, saving a storage path of the second configuration mode under the first configuration mode, thereby establishing a logic channel used for switching from the first configuration mode to the second configuration mode. When it is needed to switch from the first configuration mode to the second configuration mode, the second configuration mode can be switched to by inputting a special switch command and the storage path of the second configuration mode in the first configuration mode. Moreover, besides switching directly from the first configuration mode to the second configuration mode through the logic channel, the system also can switch directly from the first configuration mode to the second configuration mode through other ways in a related art.

The method for configuring the logic channel used for switching from the global configuration mode to the first configuration mode is the same as the above configuration method, and no further description is needed here.

Likewise, besides switching directly from the global configuration mode to the first configuration mode through the logic channel, the system also can switch directly from the global configuration mode to the first configuration mode through other ways in a related art.

At this moment, the Step 302 specifically is that: the network data configuration system acquires the logic channel configured for the global configuration mode and used for switching to the first configuration mode; the network data configuration system switches directly to the first configuration mode according to the logic channel used for switching to the first configuration mode;

the Step 303 specifically is that: the network data configuration system acquires the logic channel configured for the first configuration mode and used for switching to the second configuration mode; the network data configuration system exits from the first configuration mode and switches directly to the second configuration mode according to the logic channel used for switching to the second configuration mode.

Generally, in order to guarantee the security of network device data, the network data configuration system also needs to configure permission for a user who performs data configuration. The network data configuration method above further includes a step that the network data configuration system configures permission for a user who performs data configuration, wherein each user has permission to operate in one or more configuration modes.

At this moment, the Step 302 specifically is that: the network data configuration system judges whether the user who performs data configuration currently has permission to operate in the first configuration mode; when the user who performs data configuration currently has permission to operate in the first configuration mode, the network data configuration system switches directly to the first configuration mode;

the Step 303 specifically is that: the network data configuration system judges whether the user who performs data configuration currently has permission to operate in the second configuration mode; when the user who performs data configuration currently has permission to operate in the second configuration mode, the network data configuration system exits from the first configuration mode and switches directly to the second configuration mode.

Hereinafter, an example is provided to describe the above network data configuration method in detail.

Supposing the content of data configuration needed to be completed is as follows: data configuration of gei_1/1 module, data configuration of BGP4+ module, data configuration of address-family module and data configuration of VLAN module.

Figure 4:
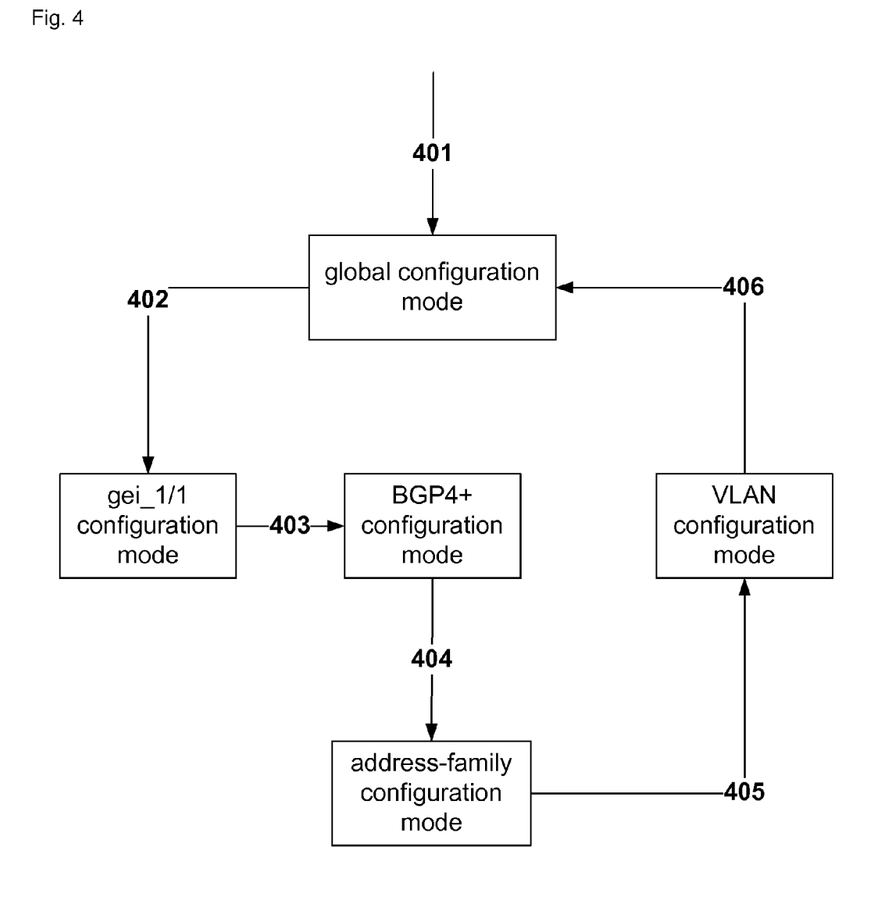
FIG. 4 shows a diagram of a specific embodiment of the network data configuration method in the embodiment of the disclosure.

The specific network data configuration method, as shown in FIG. 4, mainly includes the following steps.

Step 401: the network data configuration system enters a global configuration mode according to an input configuration command.

Step 402: supposing it is needed to configure data for the gei_1/1 module first, then a mode switch command 1 instructing switching to the gei_1/1 configuration mode is input in the global configuration mode; the network data configuration system switches from the global configuration mode to the gei_1/1 configuration mode according to the input mode switch command 1.

Step 403: after the data configuration of the gei_1/1 module is completed in the gei_1/1 configuration mode, if it is also needed to configure data for the BGP4+ module, then a mode switch command 2 instructing switching to the BGP4+ configuration mode is input in the gei_1/1 configuration mode; the network data configuration system exits from the gei_1/1 configuration mode when receiving the mode switch command 2 and switches directly to the BGP4+ configuration mode.

In the above steps, it is not necessary to switch to the global configuration mode from the gei_1/1 configuration mode and then to the BGP4+ configuration mode from the global configuration mode; instead, it is only needed to switch directly from the gei_1/1 configuration mode to the BGP4+ configuration mode, thus mode switch operations are reduced.

Step 404: after the data configuration of the BGP4+ module is completed in the BGP4+ configuration mode, if it is further needed to switch to the address-family configuration mode (a subnode of the BGP4+ configuration mode) to configure data for the address-family module, then a mode switch command 3 instructing switching to the address-family configuration mode is input in the BGP4+ configuration mode; the network data configuration system exits from the BGP4+ configuration mode when receiving the mode switch command 3 and switches to the address-family configuration mode.

Step 405: after the data configuration of the address-family module is completed in the address-family configuration mode, if it is further needed to configure data for the VLAN module, a mode switch command 4 instructing switching to the VLAN configuration mode is input in the address-family configuration mode; the network data configuration system exits from the address-family configuration mode when receiving the mode switch command 4 and switches directly to the VLAN configuration mode.

Step 406: after the data configuration of the VLAN module is completed in the VLAN configuration mode, an exit command is input in the VLAN configuration mode; the network data configuration system exits from the VLAN configuration mode when receiving the exit command and switches back to the global configuration mode.

In the above steps, it is not necessary to switch to the BGP4+ configuration mode from the address-family configuration mode, then to the global configuration mode from the BGP4+ configuration mode and finally to the VLAN configuration mode from the global configuration mode; instead, it is only needed to switch directly from the address-family configuration mode to the VLAN configuration mode; thus, mode switch operations are reduced.

Figure 5:
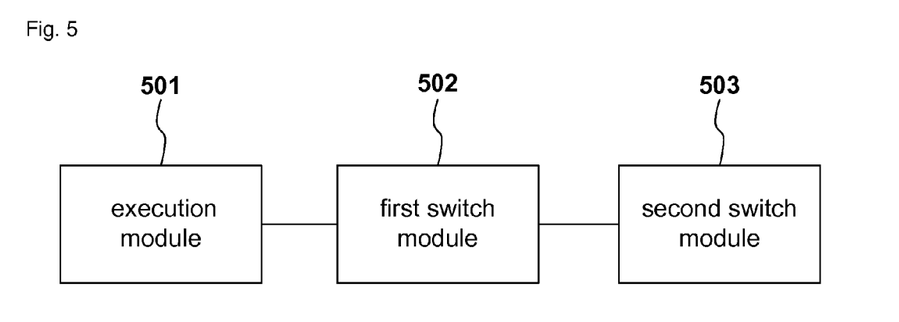
FIG. 5 shows a diagram of function modules of a network data configuration system in an embodiment of the disclosure.

Corresponding to the network data configuration method above, an embodiment of the disclosure also provides a network data configuration system, which is applied to a network device; as shown in FIG. 5, the network data configuration system includes:

an execution module 501, which is configured to enter a global configuration mode when receiving a configuration command that instructs configuring data for a network device;

a first switch module 502, which is configured to switch directly from the global configuration mode to a first configuration mode when receiving in the global configuration mode a mode switch command that instructs switching to the first configuration mode, wherein the first configuration mode is any configuration mode under the global configuration mode; and a second switch module 503, which is configured to exit from the first configuration mode and to switch directly to a second configuration mode when receiving in the first configuration mode a mode switch command that instructs switching to the second configuration mode, wherein the second configuration mode is the global configuration mode or any configuration mode under the global configuration mode.

In the above embodiment, before switching directly from the global configuration mode to the first configuration mode, it is needed to configure a logic channel used for switching to the first configuration mode for the global configuration mode; similarly, before switching from the first configuration mode to the second configuration mode, it is needed to configure a logic channel used for switching to the second configuration mode for the first configuration mode.

The network data configuration system further includes:

a first configuration module, which is configured to configure a logic channel used for switching to the first configuration mode for the global configuration mode; and a second configuration module, which is configured to configure a logic channel used for switching to the second configuration mode for the first configuration mode.

At this moment, the first switch module includes:

a first acquisition module, which is configured to acquire the logic channel configured for the global configuration mode and used for switching to the first configuration mode; and a first processing module, which is configured to switch directly to the first configuration mode according to the logic channel used for switching to the first configuration mode.

The second switch module includes:

a second acquisition module, which is configured to acquire the logic channel configured for the first configuration mode and used for switching to the second configuration mode; and a second processing module, which is configured to exit from the first configuration mode and to switch directly to the second configuration mode according to the logic channel used for switching to the second configuration mode.

Generally, in order to guarantee the security of network device data, the network data configuration system also needs to configure permission for a user who performs data configuration; therefore, the network data configuration system above further includes:

a third configuration module, which is configured to configure permission for a user who performs data configuration, wherein each user has permission to operate in one or more configuration modes;

the first switch module includes:

a first judgment module, which is configured to judge whether the user who performs data configuration currently has permission to operate in the first configuration mode; and a third processing module, which is configured to switch directly to the first configuration mode when the user who performs data configuration currently has permission to operate in the first configuration mode.

The second switch module includes:

a second judgment module, which is configured to judge whether the user who performs data configuration currently has permission to operate in the second configuration mode; and a fourth processing module, which is configured to exit from the first configuration mode and to switch directly to the second configuration mode when the user who performs data configuration currently has permission to operate in the second configuration mode.

The system provided by the above embodiment can switch directly from the global configuration mode to any configuration mode under the global configuration mode, for example, switch directly to a child node, a grandchild node or a great-grandchild node of the global configuration mode, without entering modes level by level; moreover, the system also can switch directly from any configuration mode under the global configuration mode back to the global configuration mode, without exiting from the modes level by level; further, the system also can switch directly from any configuration mode under the global configuration mode to any other configuration mode under the global configuration mode; thus, mode switch operations in the process of network data configuration can be effectively reduced and the configuration efficiency of network data can be improved.

The above are only the preferred implementations of the disclosure; it should be noted that, for the ordinary personnel skilled in the technical field, various changes and modifications can be made to the disclosure without departing from the principle of the disclosure, and the changes and modifications shall be included in the scope of protection of the disclosure.

The invention claimed is:

1. A network data configuration method, comprising:

when receiving a configuration command that instructs configuring data for a network device, a network data configuration system entering a global configuration mode;

when receiving in the global configuration mode a mode switch command that instructs switching to a first configuration mode, the network data configuration system switching directly from the global configuration mode to the first configuration mode, wherein the first configuration mode is any configuration mode under the global configuration mode; and when receiving in the first configuration mode a mode switch command that instructs switching to a second configuration mode, the network data configuration system exiting from the first configuration mode and switching directly to the second configuration mode, wherein the second configuration mode is the global configuration mode or any configuration mode under the global configuration mode;

before the network data configuration system switches directly to the second configuration mode, the method further comprising:

configuring, by the network data configuration system, a logic channel configured for the first configuration mode and used for switching to the second configuration mode for the first configuration mode, wherein configuring the logical channel comprises:

acquiring a jump interface of the second configuration mode and then saving the jump interface of the second configuration mode under the first configuration mode, thereby establishing the logic channel used for switching from the first configuration mode to the second configuration mode;

or, saving a storage path of the second configuration mode under the first configuration mode, thereby establishing the logic channel used for switching from the first configuration mode to the second configuration mode;

accordingly, the process that the network data configuration system exits from the first configuration mode and switches directly to the second configuration mode comprises:

the network data configuration system acquires the logic channel used for switching to the second configuration mode by inputting a special switch command and the jump interface of the second configuration mode in the first configuration mode, and exits from the first configuration mode and switches directly to the second configuration mode according to the logic channel used for switching to the second configuration mode:

or, the network data configuration system acquires the logic channel used for switching to the second configuration mode by inputting a special switch command and the storage path of the second configuration mode in the first configuration mode, and exits from the first configuration mode and switches directly to the second configuration mode according to the logic channel used for switching to the second configuration mode.

2. The network data configuration method according to claim 1, further comprising: before the network data configuration system switches directly from the global configuration mode to the first configuration mode, configuring, by the network data configuration system, a logic channel used for switching to the first configuration mode for the global configuration mode;

the process that the network data configuration system switches directly from the global configuration mode to the first configuration mode comprises:

the network data configuration system acquires the logic channel configured for the global configuration mode and used for switching to the first configuration mode; and the network data configuration system switches directly to the first configuration mode according to the logic channel used for switching to the first configuration mode.

3. The network data configuration method according to claim 1, further comprising: before the network data configuration system switches directly from the global configuration mode to the first configuration mode, configuring, by the network data configuration system, permission for a user who performs data configuration, wherein each user has permission to operate in one or more configuration modes;

the process that the network data configuration system switches directly from the global configuration mode to the first configuration mode comprises:

the network data configuration system judges whether a user who performs data configuration currently has permission to operate in the first configuration mode; and when the user who performs data configuration currently has permission to operate in the first configuration mode, the network data configuration system switches directly to the first configuration mode.

4. The network data configuration method according to claim 1, further comprising: before the network data configuration system switches directly to the second configuration mode, configuring, by the network data configuration system, permission for a user who performs data configuration, wherein each user has permission to operate in one or more configuration modes;

the process that the network data configuration system exits from the first configuration mode and switches directly to the second configuration mode comprises:

the network data configuration system judges whether a user who performs data configuration currently has permission to operate in the second configuration mode; and when the user who performs data configuration currently has permission to operate in the second configuration mode, the network data configuration system exits from the first configuration mode and switches directly to the second configuration mode.

5. The network data configuration method according to claim 2, further comprising: before the network data configuration system switches directly to the second configuration mode, configuring, by the network data configuration system, a logic channel used for switching to the second configuration mode for the first configuration mode, the process that the network data configuration system exits from the first configuration mode and switches directly to the second configuration mode comprises:

the network data configuration system acquires the logic channel configured for the first configuration mode and used for switching to the second configuration mode; and the network data configuration system exits from the first configuration mode and switches directly to the second configuration mode according to the logic channel used for switching to the second configuration mode.

* * * * *